US00RE38316E

(19) United States
(12) Reissued Patent
Oyama et al.

(10) Patent Number: US RE38,316 E
(45) Date of Reissued Patent: Nov. 18, 2003

(54) α+β TYPE TITANIUM ALLOY, A TITANIUM ALLOY STRIP, COIL-ROLLING PROCESS OF TITANIUM ALLOY, AND PROCESS FOR PRODUCING A COLD-ROLLED TITANIUM ALLOY STRIP

(75) Inventors: Hideto Oyama, Takasago (JP); Takayuki Kida, Osaka (JP); Kazumi Furutani, Takasago (JP); Masamitsu Fujii, Chiyoda-ku (JP)

(73) Assignee: Kabushiki Kaisha Kobe Seiko Sho, Kobe (JP)

(21) Appl. No.: 10/057,899

(22) Filed: Jan. 29, 2002

Related U.S. Patent Documents

Reissue of:
(64) Patent No.: 6,228,189
Issued: May 8, 2001
Appl. No.: 09/317,897
Filed: May 25, 1999

(30) Foreign Application Priority Data

May 26, 1998 (JP) ..... 10-144558
Nov. 12, 1998 (JP) ..... 10-322673

(51) Int. Cl.[7] ..... C22F 1/18
(52) U.S. Cl. ..... 148/669; 148/421; 420/421
(58) Field of Search ..... 148/421, 669; 420/421, 418, 419, 420

(56) References Cited

U.S. PATENT DOCUMENTS

| | | | |
|---|---|---|---|
| 4,943,412 A | | 7/1990 | Bania et al. |
| 5,264,055 A | * | 11/1993 | Champin et al. |
| 5,304,263 A | * | 4/1994 | Champin et al. |
| 6,228,189 B1 | | 5/2001 | Oyama et al. |

FOREIGN PATENT DOCUMENTS

| | | | |
|---|---|---|---|
| FR | 2144205 | * | 2/1973 |
| GB | 1299257 | | 12/1972 |
| JP | 51-17489 | | 6/1976 |
| JP | 2-301536 | | 12/1990 |
| JP | 3-166350 | * | 7/1991 |
| JP | 3-274238 | * | 12/1991 |
| JP | 4-202729 | | 7/1992 |
| JP | 7-54081 | * | 2/1995 |
| JP | 7-54083 | * | 2/1995 |
| JP | 7-70676 | | 3/1995 |
| JP | 7-90523 | * | 4/1995 |
| JP | 8-120371 | * | 5/1996 |
| JP | 8-120373 | | 5/1996 |
| JP | 9-31572 | | 2/1997 |

OTHER PUBLICATIONS

C.F. Yolton, et al., "Alloying Element Effects in Metastable Beta Titanium Alloys," Metallurgical Transactions A, vol. 10A, No. 1, (Jan. 1979), pp. 132–134.*
Kobelco Materials Exhibition Catalogue, Nov. 24–26, 1998, 4 pages.*
M. J. Donachie, Jr., ASM, pp. 39 and 47–50, "Titanium Technical Guide," 1988. (no month data).*

* cited by examiner

*Primary Examiner*—John Sheehan
*Assistant Examiner*—Andrew L. Oltmans
(74) *Attorney, Agent, or Firm*—Oblon, Spivak, McClelland, Maier & Neustadt, P.C.

(57) ABSTRACT

A high strength and ductility α+β type titanium alloy, comprising at least one isomorphous β stabilizing element in a Mo equivalence of 2.0–4.5 mass %, at least one eutectic β stabilizing element in an Fe equivalence of 0.3–2.0 mass %, and Si in an amount of 0.1–1.5 mass %, and optionally comprising C in an amount of 0.01–0.15% mass.

6 Claims, 8 Drawing Sheets

RELATIONSHIP BETWEEN ANNEALING TEMPERATURE AND TENSILE PROPERTY (2Mo-1.6V-0.5Fe-4.5Al-0.3Si-0.03C)

RELATIONSHIP BETWEEN ANNEALING TEMPERATURE AND TENSILE PROPERTY (3.5Mo-0.5Fe-4.5Al-0.3Si)

α+β TYPE TITANIUM ALLOY, A TITANIUM ALLOY STRIP, COIL-ROLLING PROCESS OF TITANIUM ALLOY, AND PROCESS FOR PRODUCING A COLD-ROLLED TITANIUM ALLOY STRIP

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a high strength titanium alloy which has high strength, excellent weldability (i.e., ductility in heat affected zone (HAZ) after welding, the same meaning hereinafter) and good ductility to make the production of strips possible. The present invention relates to a titanium alloy coil-rolling process and a process for producing a coil-rolled titanium strip, in which the titanium is the above-mentioned titanium alloy.

2. Related Art

Titanium and its alloys are light, and excellent in strength toughness and corrosion-resistance. Recently, therefore, they have widely been made practicable in the fields of the aerospace industry, the chemical industry and the like. However, titanium alloys are materials which are generally not so good in workability, so that costs for forming and working are very high, as compared with other materials. For example, Ti—6Al—4V, a typical α+β type alloy, is a material which is difficult to work at room temperature. Thus, it is said that the alloy can hardly be made into a coil by cold rolling.

For this reason, at the time of rolling the Ti—6Al—4V alloy into a sheet form, a manner called pack-rolling is adopted. That is, the pack-rolling is a manner of stacking Ti—6Al—4V alloy sheets obtained by hot rolling in the form of layers, putting the sheets into a box made of mild steel, and hot rolling the sheets packed into the box under heat-retention for keeping its temperature more than a given temperature to produce a thin plate. In this process, however, a mild steel cover for making a pack and pack welding are necessary. Moreover, in order to block bonding of titanium alloy strips themselves, a releasing agent must be applied. In such a manner, the pack-rolling process requires very troublesome works and great cost, as compared with cold rolling. Additionally, the temperature range suitable for hot rolling is limited, to cause many restrictions in working.

On the contrary, Japanese Patent Application Laid-Open Nos. 3-274238 and 3-166350 discloses that the contents of Al, V and Mo in the parent material of titanium are defined and at least one alloying element selected from Fe, Ni, Co and Cr is comprised therein in an appropriate amount, so that a titanium alloy can be obtained which has a strength substantially equal to that of the Ti—6Al—4V alloy and are superior to the Ti—6Al—4V alloy in superplasticity and hot workability.

Japanese Patent Application Laid-Open Nos. 7-54081 and 7-64083 disclose a titanium alloy in which the Al content is reduced up to a level of 1.0–4.5%, the V content is limited to 1.5–4.5%, the Mo content is limited to 0.1–2.5%, and optionally a small amount of Fe or Ni is comprised thereinto, thereby keeping high strength and raising cold workability and weldability (in particular, HAZ after welding).

This titanium alloy has both cold workability and high strength, and further has improved weldability, and thus is an excellent alloy. However, in these inventions, flow-stress during plastic deformation is suppressed because of the necessity of ensuring excellent cold workability. Thus, its strength is considerably low. If the strength is raised, its cold workability drops. For this reason, production of cold strips are substantially impossible. Incidentally, in recent years, customers' demands of high strength and high ductility to titanium alloys have been becoming more and more strict. Thus, titanium alloys are desired to be improved still more.

SUMMARY OF THE INVENTION

Paying attention to the above-mentioned situation, the inventors have made the present invention. The subject of the present invention is an α+β type titanium alloy, and an object thereof is to provide an α+β type titanium alloy having excellent strength and cold workability, and further having ductility making it possible to produce strips in coil. Another object of the present invention is to establish a continuous rolling technique based on coil-rolling by devising working conditions, and provide a process for obtaining a titanium alloy having excellent workability and strength by annealing after the coil-rolling.

The high strength and ductility α+β type titanium alloy of the present invention for overcoming the above-mentioned problems comprises at least one isomorphous β stabilizing element in a Mo equivalence of 2.0–4.5 mass %, at least one eutectic β stabilizing element in an Fe equivalence of 0.3–2.0 mass %, and Si in an amount of 0.1–1.5 mass %. (Hereinafter, % means % mass unless specified otherwise.) In the titanium alloy, a preferred Al equivalence, including Al as an α stabilizing element, is more than 3% and less than 6.5%. If C is further comprised thereinto in an amount of 0.01–0.15%, the strength property of the alloy becomes more excellent.

The process for coil-rolling relates to a coil-rolling process which is suitable for the above-mentioned titanium alloy and makes continuous production possible. The process comprises annealing a strip of the titanium alloy at a temperature satisfying the following inequality [1], and then coil-rolling the resultant.

$$(\beta\ \text{transus}-270^\circ\ \text{C.}) \leqq T \leqq (\beta\ \text{transus}-50^\circ\ \text{C.}) \quad (1)$$

At the time of the coil-rolling, preferably the tension for the coil-rolling ranges from 49 to 392 MPa and the rolling ratio for the coil-rolling is 20% or more. If the coil-rolling is performed plural times in a manner that an annealing step in the α+β temperature range intervenes therebetween, the total rolling reduction can be raised as the occasion demands. Thus, even a thin plate can easily be obtained.

Furthermore, the process for producing a titanium alloy strip according to the present invention is a process of specifying annealing suitable for cold-rolled strips after the cold-rolling of the above-mentioned α+β type titanium alloy. The process is characterized by improving transverse elongation of a cold-rolled titanium strip by selecting a heating temperature at the time of annealing from temperatures which are not less than temperature for relieving work-hardening at the time of cold-rolling and are temperatures, in the range of temperatures not more than β transus (Tβ), for promptly avoiding temperature ranges causing brittleness resulting from the formation of brittle hexagonal crystal α, so as to perform the annealing.

The above-mentioned titanium alloy is used to perform the annealing, so as to easily obtain a titanium alloy strip having a tensile strength after the annealing of 900 MPa or more, an elongation of 4% or more, and [longitudinal (coil-rolling direction)]/[transverse (direction perpendicular to the coil-rolling direction) elongation] of 0.4–1.0.

DESCRIPTION OF THE PREFERRED EMBODIMENTS

Figure 1:
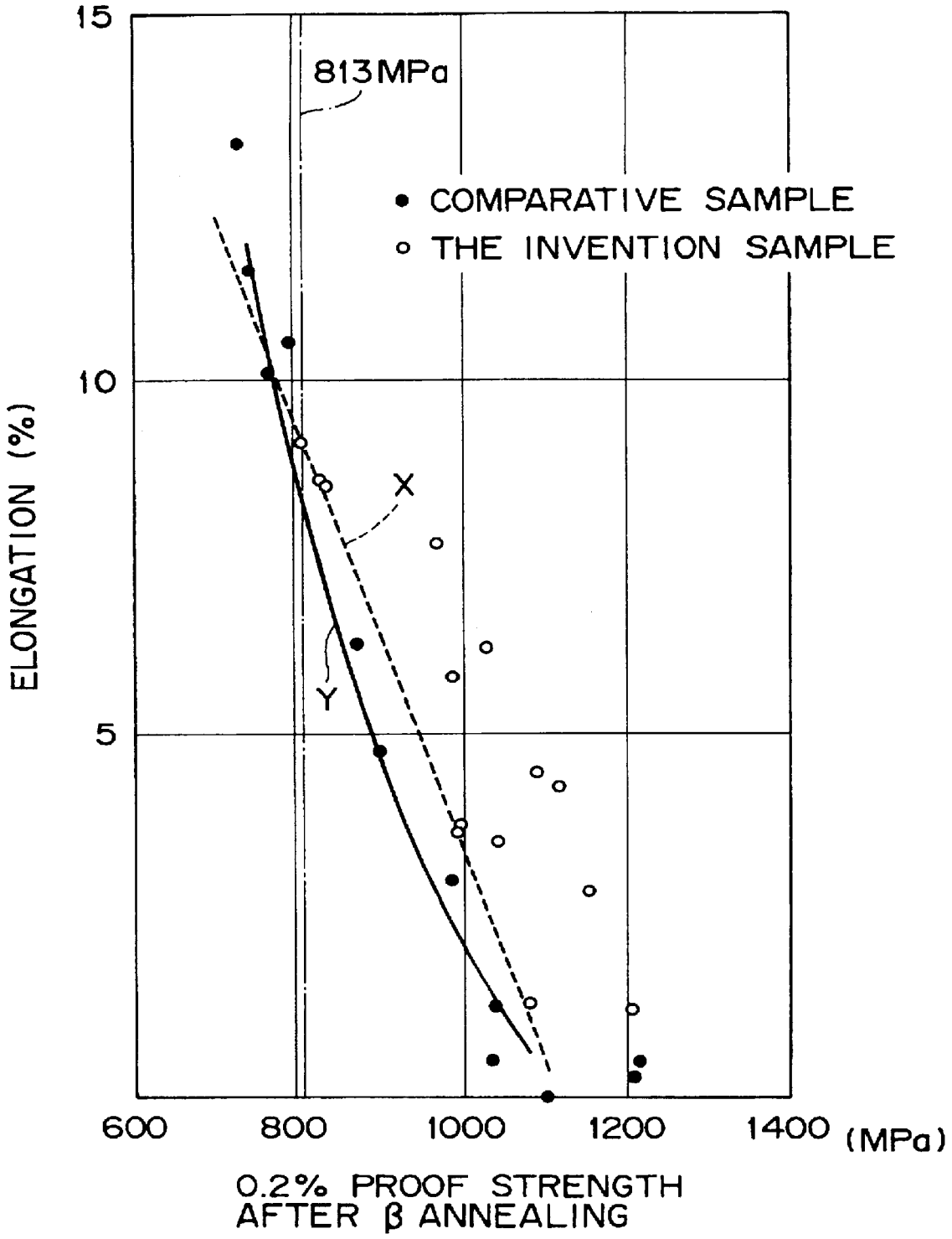
FIG. 1 is a graph showing the relationship between 0.2% proof strength and elongation, after annealing in the β temperature range (corresponding to the properties in HAZ after welding).

The α+β type titanium alloy of the present invention has a basic conception wherein the contents of isomorphous β stabilizing element and eutectic β stabilizing element are defined, and preferably Al equivalence including Al, which is an α stabilizing element, is defined. The α+β titanium alloy is an alloy wherein in appropriate amount of Si is comprised into the basic composition and preferably an appropriate amount of C is comprised as another element thereto, so as to give excellent strength property and cold workability, thereby having high strength and simultaneously making the production of coils possible. The following will describe reasons of defining the contained percentages of the above-mentioned respective elements.

At least one isomorphous β stabilizing element: Mo equivalence of 2.0–4.5%:

The isomorphous β stabilizing elements such as Mo cause an increase in the volume fraction of the β phase, and is solved into the β phase to contribute to a rise in strength. Moreover, the isomorphous β stabilizing elements have a nature that they are solved into the parent material of titanium to produce fine equiaxial microstructure easily. They are useful elements from the standpoint of enhancing strength-ductibility balance. In order to exhibit such effects of the isomorphous β stabilizing elements effectively, they should be comprised in an amount of 2.0% or more, and preferably 2.5% or more. However, if the amount is too large, ductility after β annealing decreases and further corrosion of the titanium alloy increases. Thus, it becomes difficult to remove $TiO_2$ scales produced in the annealing after cold rolling and an oxygen-solved ground metal, called an α-case, so that the workability falls. Additionally, the density of the whole of the titanium alloy is heighten to damage the property of a high specific strength which the titanium alloy originally has. Therefore, the above-mentioned amount should be 4.5% or less, and preferably 3.5% or less.

The most typical element among all isomorphous β stabilizing elements is Mo. However, V, Ta, Nb and the like have substantially the same effect as that of Mo. In the case wherein these elements are contained, the Mo equivalence [Mo+1/1.5×V+1/5×Ta+1/3.6×Nb], including these elements, should be adjusted into the range of 2.0–4.5%. At Least One Eutectic β Stabilizing Element: Fe Equivalence of 0.3–2.0%.

The eutectic β stabilizing elements such as Fe cause thereof. Moreover, they have the effect of improving hot improvement in strength by addition of a small amount workability. Furthermore, cold workability is enhanced, particularly when Mo and Fe coexist, but this reason is unclear at present. In order to exhibit such effects effectively, Fe should be contained in an amount of 0.3% or more, and preferably 0.4% or more. However, if the amount is too large, durability after β-annealing is greatly lowered and further segregation becomes remarkable at the time of ingot-making to reduce the stability of quality. The amount should be 2.0% or less and preferably 1.5% or less.

Cr, Ni, Co and the like have substantially the same effect as that of Fe. Thus, in the case that Cr and the like are contained, the Fe equivalence [Fe+1/2×Cr+1/2×Ni+1/1.5×Co+1/1.5×Mn], including these elements, should be adjusted into the range of 0.3–2.0%.

Al Equivalence: More Than 3%, and Less Than 6.5%

Al is an element which contributes, as an α-stabilizing element, to the improvement strength. If the Al content is 3% or less, the strength of the titanium alloy is insufficient. However, if the Al content is 6.5% or more, the limit cold-reduction is lowered so that it becomes difficult to make the alloy into a coil. Additionally, the cold workability as a coil product is also lowered so as to increase the number of cold working steps and annealing steps until the alloy is rolled up to a predetermined thickness. Thus, a rise in cost is caused. Considering the strength-cold workability balance, preferably the lower limit and the upper limit of the Al equivalence are 3.5% and 5.5%, respectively.

In the present invention, Sn and Zr also exhibit the effect as an α-stabilizing element in the same way as Al. Therefore, in the case that these elements are contained, the Al equivalence [Al+1/3×Sn+1/6×Zr], including these elements, should be desirably adjusted into the range of more than 3% and less than 6.5%.

Typical examples of preferable α+β type titanium alloys satisfying the requirement of the above-mentioned composition used as a base titanium alloy in the present invention includes Ti—(4–5%)Al—(1.5–3%)Mo—(1–2%)V—(0.3–2.0%)Fe, in particular Ti—4.5% Al—2% Mo—1.6% V—0.5% Fe.

Si: 0.1–1.5%

The α+β type titanium alloy having the basic composition that satisfies the content requirements of the isomorphous β stabilizing element, the eutectic β stabilizing element, and the Al equivalence has an excellent cold workability exhibiting a limit cold-reduction of about 40% or more. Thus, the alloy can be made into a coil. However, its strength property and weldability are not necessarily sufficient. The alloy cannot meet the recent demand of enhancing strength.

However, it has been ascertained that if Si is contained in an amount of 0.1–1.5% into the α+β type alloy of the above-mentioned basic composition, it is possible to heighten remarkably the strength property and the property (strength and ductility) in HAZ after welding, as a titanium alloy, without lowering ductility necessary for making the alloy into a coil.

In other words, Si has an effect of raising the strength property in the state that Si hardly has a bad influence on cold-reduction of the α+β type titanium alloy. Furthermore, Si exhibits an effect of raising the strength and ductility in HAZ after welding. By such addition of an appropriate amount of Si, it is possible to obtain an alloy wherein the strength and ductility of the titanium alloy parent material are raised still more and further the HAZ after welding have strength and ductility of a high level.

In order to exhibit such effects of Si more effectively, it is necessary that Si is contained in an amount within a very restrictive range of 0.1–1.5%. If the Si content is insufficient, the strength tends to be short. Moreover, the effect of the improvement in the strength-ductility balance of the welded zone also becomes insufficient. On the other hand, if the Si content is more than 1.5%, the cold-reduction becomes poor so that coil cannot easily be produced. Considering the above-mentioned advantages and disadvantages of Si, preferably the lower limit and the upper limit of the Si content are 0.2% and 1.0%, respectively.

C: 0.01–0.15%

Carbon (C) has an effect of enhancing the strength property of the α+β type titanium alloy still more while keeping excellent ductility thereof, and an effect of enhancing the strength in HAZ after welding remarkably with a little drop in the ductility thereof. Such effects of the addition of C makes the strength and the ductility of the titanium alloy parent material far higher, and also makes the strength and the ductility of the HAZ even higher.

In order to exhibit such effects of C more effectively, it is necessary that C is contained in an amount within a very restrictive range of 0.01–0.15%. If the C content is insufficient, the strength is insufficient. On the other hand, if the C content is over 0.15%, cold-reduction is damaged by remarkable precipitation-hardening of carbides such as TiC to block coil-rolling. Considering such advantages and disadvantages of C, preferably the lower limit and the upper limit of the C content are 0.02% and 0.12%, respectively.

In the present invention, if a small amount of O(oxygen) is comprised thereto, as well as Si and C, the strength can be raised still more in the state that the oxygen hardly has a bad influence on coil-formation of the titanium alloy and its ductility. Thus, it is preferable for oxygen to be comprised. Such an effect of oxygen is exhibited by its very small amount. In order to exhibit the effect more surely, oxygen is comprised in an amount of preferably about 0.07% or more, and more preferably about 0.1% or more. However, if the oxygen content is too large, the cold workability drops. Besides, the ductility also drops by an excessive rise in the strength. The oxygen content should be 0.25% or less and preferably 0.18% or less.

Reasons why such effects and advantages as above are exhibited in the present invention by comprising an appropriate amount of Si, C plus such an amount of Si, or further an appropriate amount of oxygen into the α+β type titanium alloy as a base are not necessarily made clear, but the following reasons can be considered.

That is, the reason why the strength property can be improved without damaging the cold-reduction can be considered as follows. Although Si is solved into the β phase to contribute to the strength, Si is not a factor for reducing the ductility very much. Even if Si is comprised over its solubility limit, silicide is formed so that the concentration of Si in the β phase is kept not more than a given level. Therefore, if the Si content is controlled into the range that the ductility is not reduced by the excessive formation of silicide, the alloy keeps a high ductility and simultaneously has an improved strength property.

If Si is comprised in an appropriate amount, silicide formed in the β phase as described above causes the suppression of a phenomenon that the grain in the HAZ after welding is made coarse. Additionally, Ti is trapped by the precipitation of silicide so that the β phase is stabilized, or the retained β phase increases by the transformation-suppressing effect of solved Si. It appears that these effects are cooperated to improve weldability.

Carbon is solved into the α phase to contribute to the improvement in the strength, but does not become a factor for reducing the ductility of the α phase very much. In addition, if C is comprised over its solubility limit, a carbide is formed so that the concentration of C in the α phase is kept not more than a certain level. Therefore, it appears that if the C content is controlled into the range that the durability is not reduced by the excessive of carbide, the alloy keeps a high ductility and simultaneously has an improved strength property.

Furthermore, O is solved into both of the α phase and the β phase (the solved amount is larger in the α phase), to exhibit solution-hardening effect. However, if the solved amount becomes large in either phase, the ductility is reduced. Thus, the oxygen content should be controlled into a very small amount as described above.

Small amounts of other elements than the above may be comprised as inevitable impurity elements into the titanium alloy of the present invention. However, so far as they do not hinder the property of the alloy of the present invention, these elements is allowable to be comprised.

The α+β type titanium alloy of the present invention wherein the constituent elements are specified as above has a basic composition wherein the contents of the isomorphous β stabilizing element and the eutectic β stabilizing element are defined, and preferably Al equivalence is defined. The α+β type titanium alloy is an alloy wherein an appropriate amount of Si is comprised into this basic composition or optionally an appropriate amount of C or O is comprised thereinto so as to have a high level strength property and simultaneously an excellent ductility making the production of coils possible, and further have an excellent weldability. Specifically, the alloy has a 0.2% proof strength after annealing in the α+β temperature range of 813 MPa or more, a tensile strength of about 882 MPa or more, and a limit cold-reduction of 40% or more.

Even in the case of α+β type titanium alloys, if the alloys have a limit cold-reduction of less than 40%, at the time of producing the alloys continuously into coils the number of repeated cold rolling-annealing steps becomes large so that costs become unsuitable for the actual situation. In addition, recrystallized microstructure cannot easily be obtained, resulting in a problem that the transverse and longitudinal anisotropy as a strip material becomes larger. However, the alloy having a limit cold-reduction of 40% or more can be made into coils without any difficulty by a continues method. Costs can be greatly reduced by the improvement in productivity.

The limit cold-reduction herein means a reduced ratio of a strip thickness in such a limit state that, after the step wherein a small crack is produced but the propagation of the crack stops at a certain level (for example, about 5 mm), the crack starts to propagate up to the surface of the strip, from an industrial standpoint.

Incidentally, in the present invention, a high level strength property can be kept and simultaneously an excellent cold-reduction making the production of coils possible can be ensured by specifying the basic composition of the α+β type titanium alloy and simultaneously specifying the Si content, or further the C or O content as described above. From further investigations on requirements for surer assurance of the strength property in HAZ after welding, of such titanium alloys, it has been ascertained that the alloy wherein the relationship between the 0.2% proof strength (YS) and the elongation (EL) satisfies the following inequality (1) is good in the strength-elongation balance in the HAZ after welding and stably exhibits a high weldability. This matter will be in detailed described, referring to FIG. 1, in Examples described later.

$$6.9\times(YS-835)+245\times(EI-8.2)\geqq 0 \quad [2]$$

The following will describe a coil-rolling process for producing the α+β type titanium alloy of the present invention efficiently and continuously.

At the time of coil-rolling the above-mentioned titanium alloy, a strip of titanium alloy is annealed at the temperature (T) satisfying the inequality [1] below, and then coil-rolled to produce coils efficiently and continuously. Furthermore, at the time of the coil-rolling, it is preferred to adjust the tension into the range of 49–392 MPa and set a rolling ratio to 20% or more. If the coil-rolling is performed plural times in a manner that an annealing step in the α+β temperature range intervenes therebetween, the total rolling reduction can be heighten as the occasion demands. Even a thin plate can easily be obtained.

$$(\beta\text{transus}-270^\circ\ \text{C.})\leqq T\leqq(\beta\text{transus-}50^\circ\ \text{C.}) \quad [1]$$

The heat treatment conditions are very important requirements for performing the coil-rolling easily.

Figure 2:
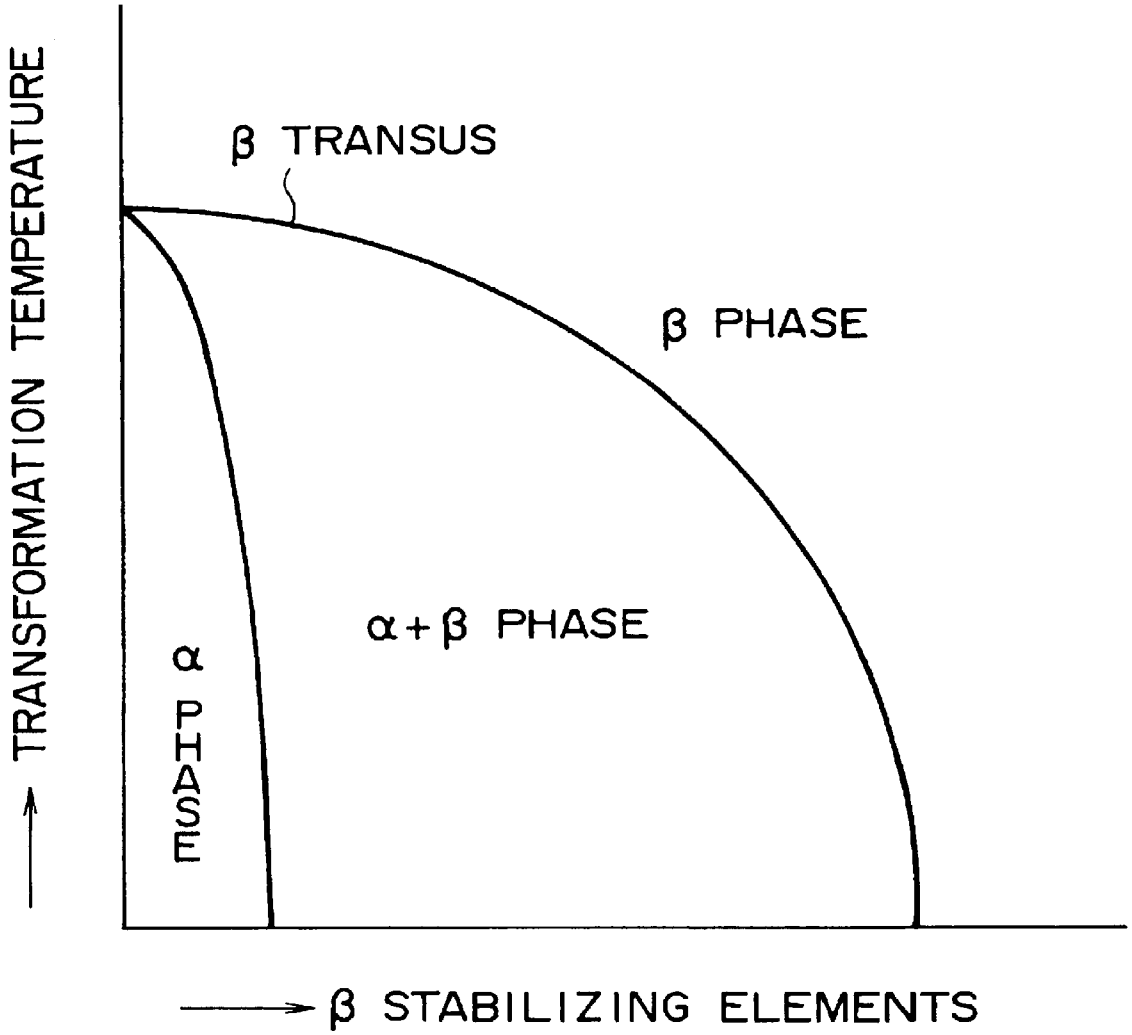
FIG. 2 is a phase diagram of a titanium alloy.

That is, the criterion of the microstructure which controls mechanical properties of titanium alloys is a phase diagram as shown in FIG. 2. (Its vertical axis represents temperature, and its horizontal axis represents the amount of β-stabilizing elements.) As the contained percentage of the β stabilizing elements in the titanium alloy increases, the β transus drops in the form of a parabola. Therefore, at the time of heat-treating titanium alloys, their microstructure varies remarkably dependently on whether the heat temperature is set up to a high temperature than the β transus of the respective alloys, or a lower temperature than it.

The inventors paid attention to the β transus of titanium alloys and the change in their microstructure by heat treatment temperature, and considered that, concerning the α+β type alloy of the present invention, a microstructure suitable for cold rolling would be obtained by setting appropriate heat treatment conditions. Thus, the inventors have been researching from various standpoints. As a result thereof, it has been found that if the titanium alloy strip having the composition according to the present invention is subjected to annealing at a temperature (T) satisfying the following inequality [1], its microstructure can be made up to a microstructure comprising α phase+metastable β phase or orthohombic martensic (α") and having a very high ductility so that coil-rolling can easily be performed.

$$(\beta\text{transus}=270^\circ\ \text{C.})\leqq T\leqq(\beta\text{transus}-50^\circ\ \text{C.}) \quad [1]$$

As described in, for example, "METALLURGICAL TRANSACTIONS A, VOLUME 10A, JANUARY 1979, P.132–134", the β transus of Ti alloys which are objects of coil-rolling can be obtained from, for example, the following equation [3], which is well known as a calculating equation of the β transus obtained from the amounts of alloying elements contained in the titanium alloys:

$$\text{the } \beta \text{ transus}=872+23.4\times Al\%-7.7\times Mo\%-12.4\times V\%-14.3\times Cr\%-8.4\times Fe\% \quad [3]$$

Referring to a phase diagram of FIG. 3, reasons for setting the annealing temperature conditions for which the β transus is an index will be made clear in the following.

Figure 3:
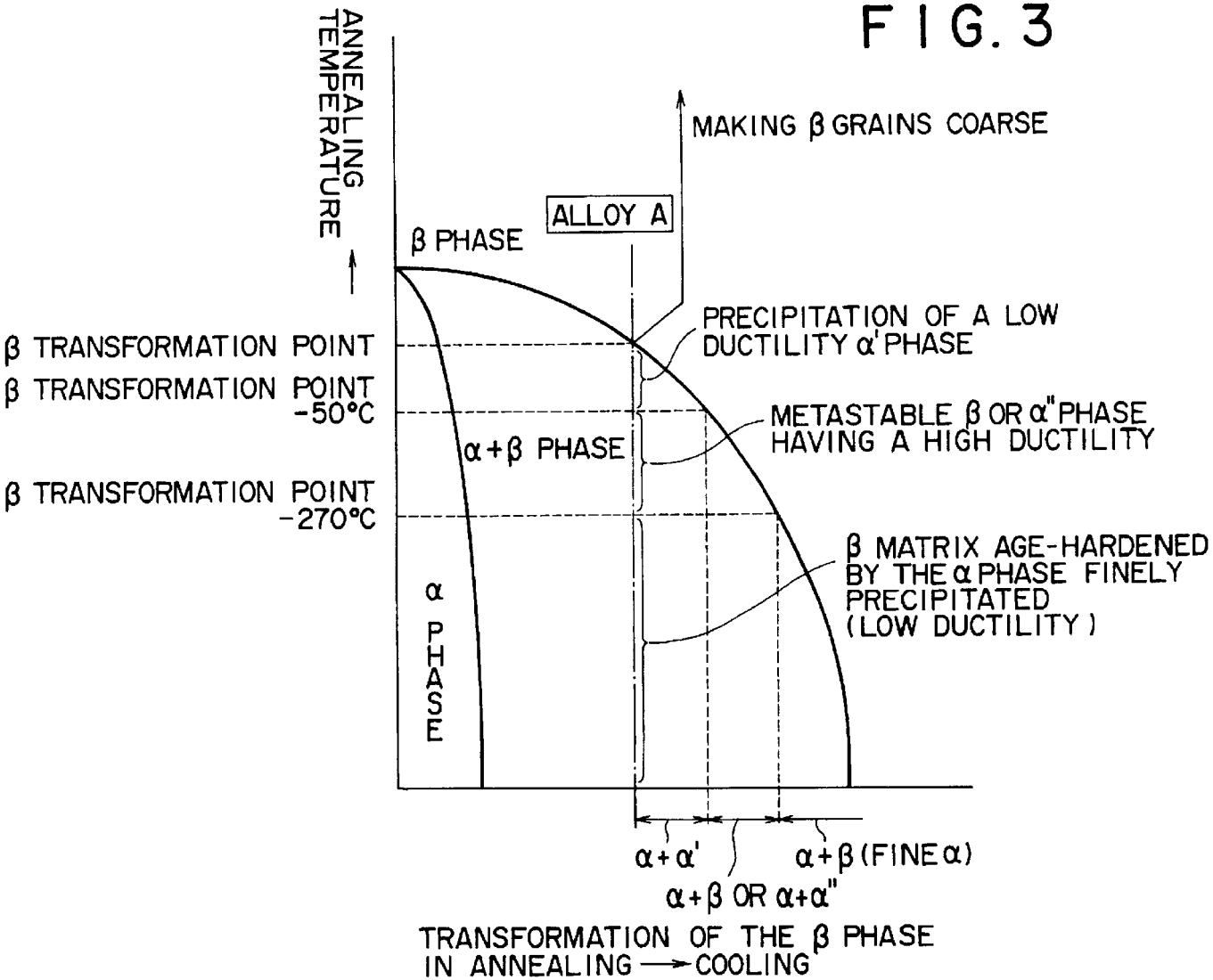
FIG. 3 is a view for explaining the coil-rolling process of the present invention, referring to a phase diagram.

In connection with FIG. 3, the inventors ascertained the following in the case of annealing α+β type titanium alloy A. When annealing temperature (T) is set within the range "(βtransus−270° C.)−(βtransus−50° C.)", the obtained microstructure becomes a structure comprising primary α phase+metastable β phase or orthohombic martensite (α") and having a very high ductility so as to have excellent workability making satisfactory cold rolling possible. On the other hand, in the low temperature range wherein the annealing temperature (T) does not reach (βtransus−270° C.), the microstructure of the alloy becomes an age-hardened microstructure wherein the α phase is finely precipitated in the β matrix. Thus, its ductility becomes poor so that its workability deteriorates extremely. On the contrary, in the temperature range wherein the annealing temperature (T) is from (the β transus−50° C.) to the β transus, martensite (α') having a low ductility is produced in the metallic microstructure after annealing and cooling so that good workability cannot be obtained as well. When annealing is performed at a higher temperature than the β transus, β grains get coarse so that cold workability unfavorably decreases.

Based on the above-mentioned finding, a first characteristic of the coil-rolling process of the present invention is that the α+β type alloy of the present invention is made up to have a high ductility microstructure comprising primary α phase+metastable β phase or orthohombic martensite (α") by annealing the alloy within the temperature range of "(βtransus−270° C.)−(β transus−50° C.)", so that the coil-rolling of the alloy is made easy. The time necessary for annealing within the temperature range is not especially limited. However, in order to make the whole of any treated titanium alloy strip into the microstructure, the time is preferably 3 minutes or more, and more preferably about 1 hour or more.

Conditions of coil-rolling performed after suitable annealing as describe above are not especially limited. Concerning especially preferred conditions, however, tension is 49–392 MPa, and rolling reduction is 20% or more.

Namely, in coil-rolling, tension is applied to a material to be rolled in its rolling directions in order to heighten rolling efficiency, and it is effective at the time of coil-rolling the above-mentioned α+β type titanium alloy that the rolling tension is controlled into a suitable range. The rolling tensile strength herein means a value obtained by dividing the tension at the time of the rolling by the sectional area of the titanium alloy strip, and is generated by a winding reel for coils arranged before and after a rolling roll. That is, if the rolling tension is changed, the tension for winding coils during the rolling and after the rolling can also be changed accordingly.

The α+β type titanium alloy of the present invention has a higher strength and lower Young's modulus than pure titanium so that spring-back is liable to arise. Thus, if the rolling tensile is low, winding of coils easily gets loose so that production efficiency is reduced and further scratches are easily generated between layers of the strip by the loose winding. Thus, the yield of products tends to be reduced. For such reason, the rolling tension is set to 49 MPa or more, and preferably 98 MPa or more.

Incidentally, in the above-mentioned α+β type titanium alloy having a higher strength than pure titanium and equiaxial microstructure, in particular fracture resistance is low so that crack propagation arises easily. Thus, it is feared that coil failure arises from a small edge crack produced in the rolling, as a starting point. Therefore, in order not to promote the outbreak of edge cracks and the propagation thereof, the rolling tension is set up to 392 MPa or less, and preferably 343 MPa or less.

The rolling reduction is set up to about 20% or more and preferably about 30% or more. This is because a rolling reduction of less than 20% is disadvantageous for the improvement in productivity and makes it impossible to give plastic strain necessary and sufficient for making the alloy up to equiaxial microstructure in the annealing step after the rolling. If the alloy is not made up to the equiaxial microstructure, the strength-ductility balance falls. Thus, such a case is unfavorable for the material property of the alloy. The upper limit of the rolling reduction varies in accordance with difference in the property of particular alloys. The upper limit is set up to about 80% or less, and preferably about 70% or less in order to prevent the increase in flow stress by work-hardening and the propagation of edge cracks.

In above-mentioned coil-rolling, in the case of some rolling reduction, the alloy may be rolled up to a target thickness by only one coil rolling step after annealing. If the rolling reduction for one rolling step is excessively raised, there arises problems, for example, the increase in flow stress by work-hardening, and the propagation of edge cracks. Generally, therefore, in the rolling process, coil-rolling is stepwise performed in such a manner that plural annealing steps intervene in the rolling process. In order to raise the strength-ductility balance, it is effective that the α+β titanium alloy is made up to fine equiaxial microstructure. In order to realize the equiaxial microstructure effectively, it is preferred that the rolling step under the above-mentioned suitable conditions is performed plural times in such a manner that an annealing step in the α+β temperature range intervenes therebetween than rolling is performed one time at a large rolling reduction and then annealing is performed.

The following will describe a process for producing a cold-rolled strip, suitable for the α+β type alloy of the present invention.

The inventors have succeeded in improving elongation of in particular the transverse direction (direction perpendicular to the cold coil-rolling direction) along which ductility is extremely reduced in the cold coil-rolling step, and heightening deformability while keeping a high strength by selecting such an annealing condition. The structure feature of the present invention and its effect and advantage will be described hereinafter, following details of experiments.

The inventors eagerly researched the α+β type titanium alloy making cold coil-rolling possible, according to the present invention, in order to make clear the influence on the ductility and the strength in the longitudinal direction (identical to the coil-rolling direction) and the transverse direction by annealing conditions after cold coil-rolling.

Figure 4:
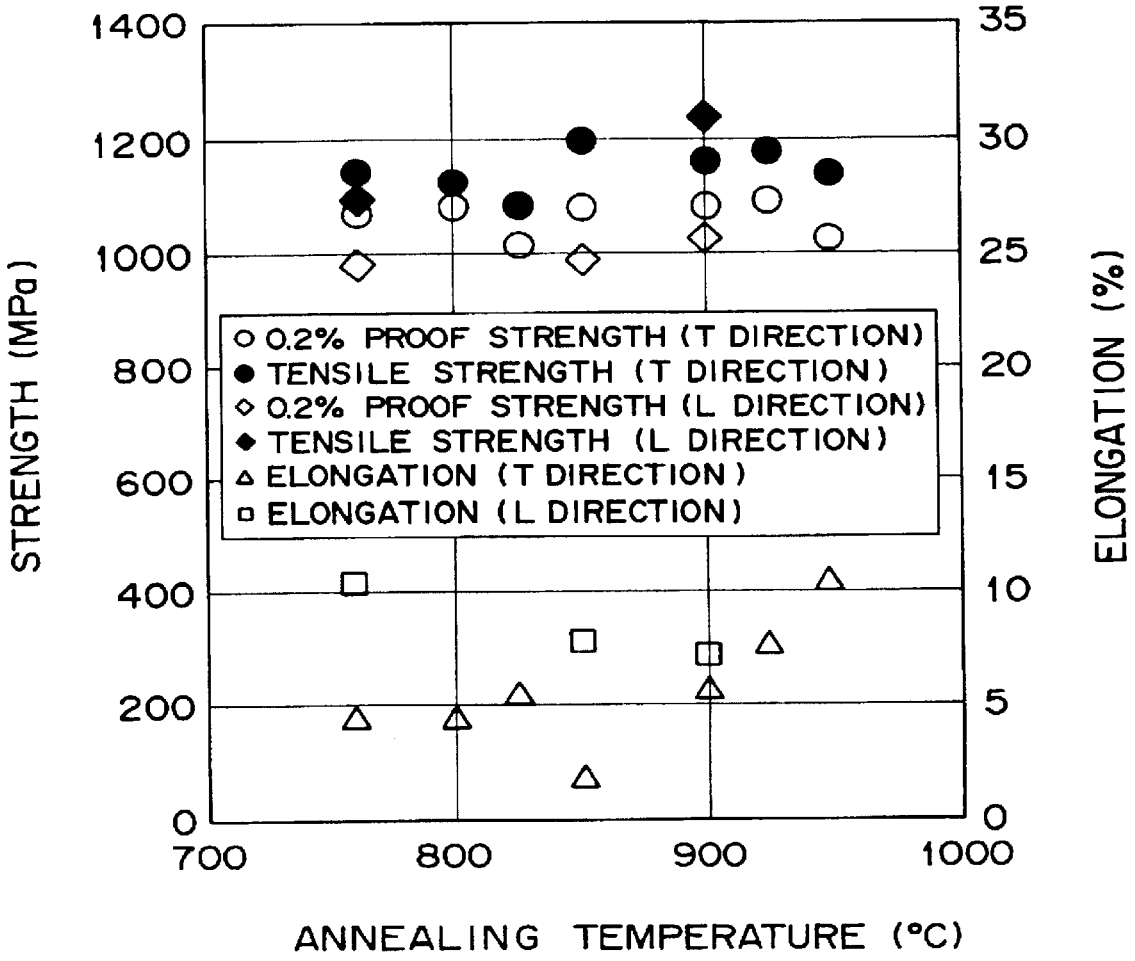
FIG. 4 is a graph showing the relationship between annealing temperature, and strength and elongation obtained in Experiment Examples.
Figure 5:
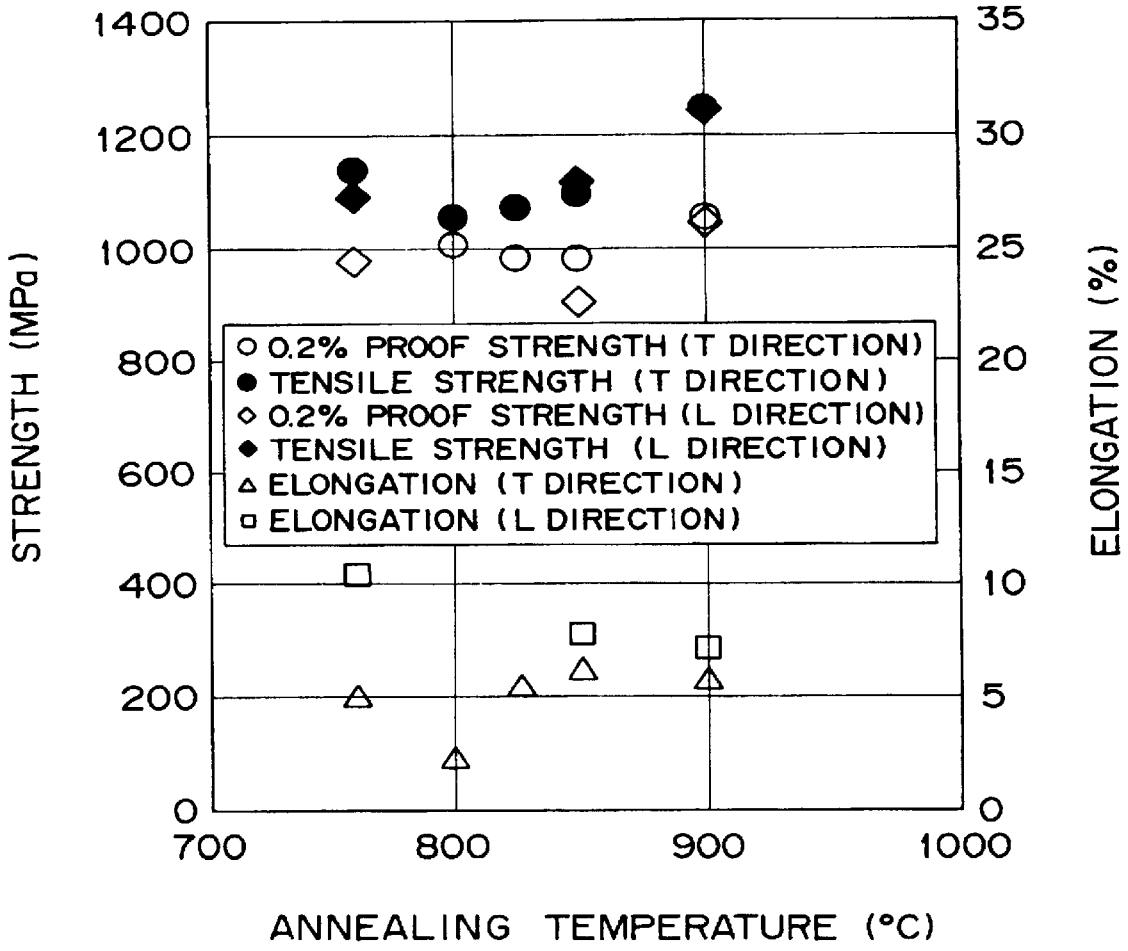
FIG. 5 is a graph showing the relationship between annealing temperature, and strength and elongation obtained in other Experiment Examples.

As a result, it was ascertained that as shown in attached FIGS. 4 and 5, proof strength and tensile strength are not affected very much by annealing temperature, but concerning in particular transverse elongation (along the transverse direction, a drop in ductility by cold coil-rolling becomes the most serious problem), specific tendency is exhibited in accordance with the annealing temperature. In short, in the above-mentioned alloy system, the transverse elongation shows a minimum value by some annealing temperature (about 850° C. in FIG. 4, and about 800° C. in FIG. 5). The transverse elongation tends to rise in all annealing temperature ranges above and below the above-mentioned temperature.

The inventors further pursued a reason why the above-mentioned specific tendency is exhibited, so as to make the following fact clear.

In general, annealing after cold coil-rolling is carried out to relieve work-hardening generated by the cold coil-rolling by recrystallization based on heating and recover the transverse ductility lowered mainly by the cold rolling. It is considered that such ductility-improving effect by recrystallization is improved still more as the annealing temperature is higher.

Figure 6:
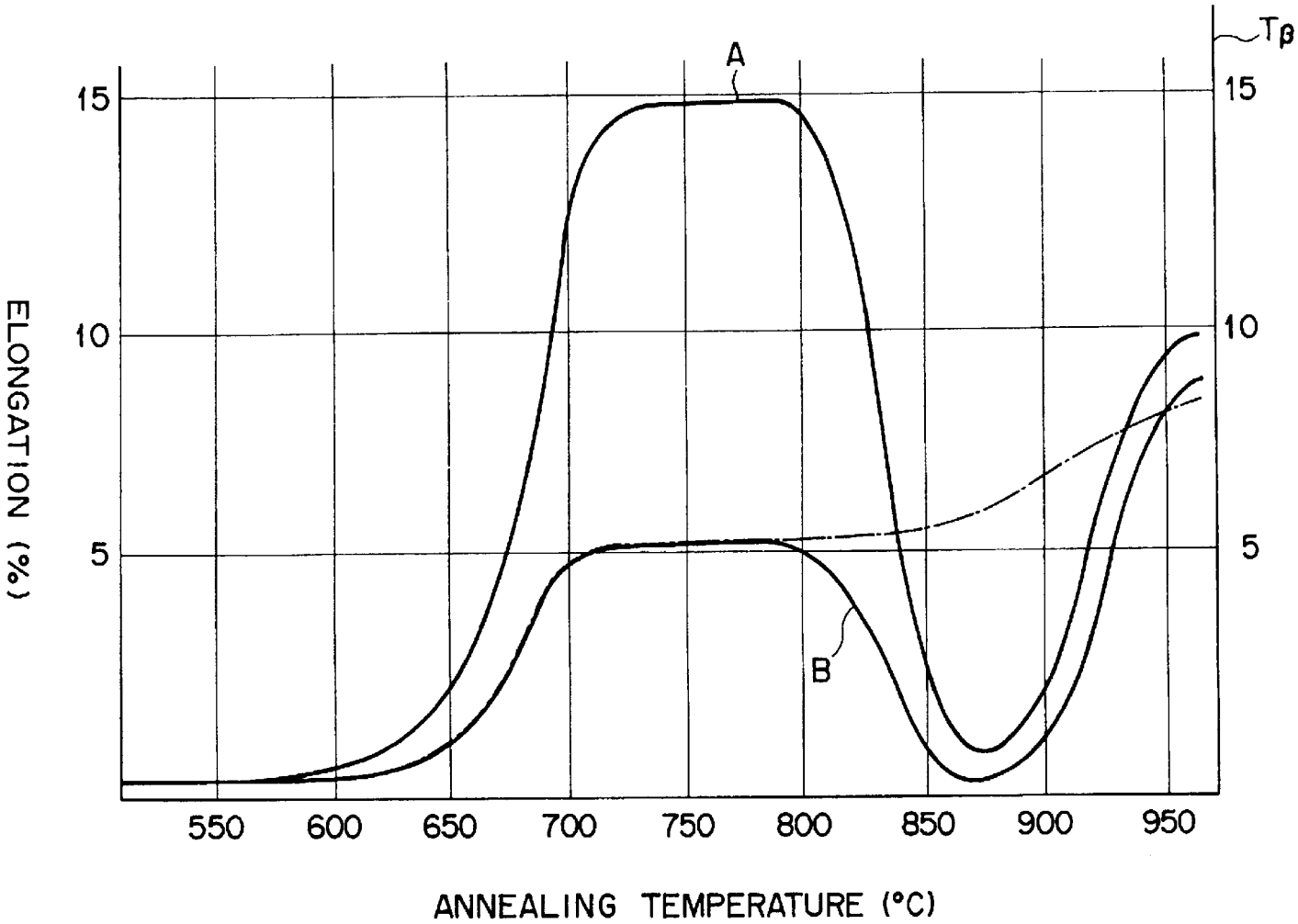
FIG. 6 is a view conceptually showing the relationship between annealing temperature and elongation that the inventors have ascertained.

The alternate long and short dash line in FIG. 6 conceptually shows the relationship between annealing temperature and ductility that is generally recognized. In the low temperature range wherein the annealing temperature after cold rolling is about 600° C. or less, the effect of improving the transverse ductility is hardly recognized. When the annealing temperature is raised up to about 700° C. or more, the ductility is recovered to some extent. As the annealing temperature is raised thereafter, the recovery of the ductility advances. When the annealing temperature is raised to not less than the β transus (Tβ), complete recrystallization arises so that anisotropy is cancelled. Thus, it appears that the ductility is remarkably improved.

Concerning the α+β type titanium alloy of the present invention, however, the inventors examined the relationship between annealing temperature and elongation after cold coil-rolling. As result, the following were ascertained. As shown by solid lines A and B in FIG. 6, in the range of the annealing temperature of about 800° C. or less, both of the longitudinal elongation (solid line A) and the transverse elongation (solid line B) are improved by the evolution of recovery of dislocation as the temperature rises. This fact is the same as the recognition in the prior art. When the annealing temperature is raised to more than about 800° C., the elongations drop abruptly. When the annealing temperature is further raised thereafter, the elongations again rise abruptly. Such a specific tendency is exhibited. It was ascertained that such a specific tendency is remarkably exhibited in the case of the α+β type titanium alloy of the present invention.

Figure 7:
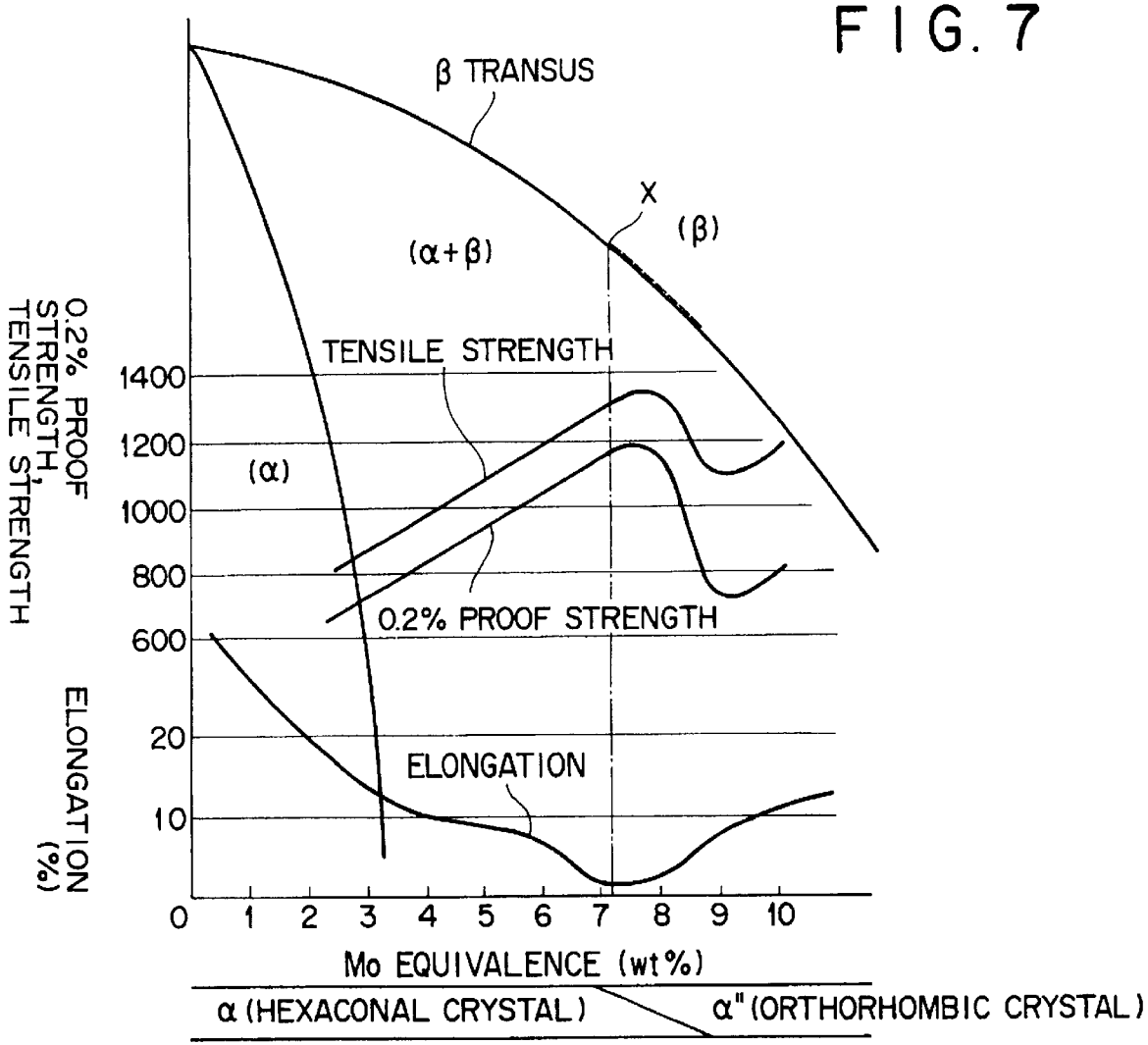
FIG. 7 is a view showing the relationship of ductility of the transformed β phase (i.e., the α phase) in the titanium alloy, in the light of a phase diagram in an α+β type titanium alloy.

This tendency can be explained on the basis of a phase diagram of the α+β type titanium alloy as shown in FIG. 7 and change in the microstructure of the titanium alloy. That is, FIG. 7 is a diagram showing the relationship of the ductility of the transformed β phase (i.e.,, the α phase) in the titanium alloy, in the light of the phase diagram of the α+β type titanium alloy. The α phase wherein the amount of the β stabilizing elements is relatively small has a hexagonal structure which is relatively excellent in ductility. On the other hand, as the amount of β stabilizing elements increases, brittle hexagonal crystal is produced at some amount as a borderline so that the ductility drops abruptly. When the amount of β stabilizing elements increases still more thereafter, an orthohombic crystal having a relatively high ductility is formed. As a result, its yield stress and tensile strength drop but its ductility tends to rise again. In summary, the ductility of the α+β type titanium alloy varies considerably, dependently on the difference in the crystal structure resulting from the change in the amount of β stabilizing elements. It is important to prevent the emergence of the brittle hexagonal crystal which is generated just before the emergence of he orthohombic crystal by controlling the alloy composition.

As is evident from the tendency shown in FIGS. 6 and 7, the ductility of the α+β type titanium alloy after cold coil-rolling is not simply decided by the annealing temperature for recrystallization for relieving work-hardening. The ductility is remarkably affected by the crystal structure of the titanium alloy as well. As result from a synergetic effect of these, the following is considered. Even in the case that the annealing temperature for recrystallization is raised as shown in FIG. 6, when the transformed β phase turns mainly into brittle hexagonal crystal, its ductility drops abruptly. After the time when the brittle hexagonal crystal structure turns into an ductile orthohombic structure having a high ductility, the ductility of the alloy is abruptly recovered again by the evolution recrystallization based on annealing.

As described above, the present invention is based on the verification of the fact that the ductility of the α+β type titanium alloy after cold coil-rolling is not simply decided by the annealing temperature for recrystallization for relieving work-hardening and the ductility is remarkably affected by the crystal structure of the titanium alloy as well. In short the characteristic of the present invention is in that when work-hardening is relieved by annealing the cold coil-rolled α+β type titanium alloy to raise the ductility, the annealing temperature is controlled to avoid temperature range causing the brittle phase production based on the emergence of the brittle hexagonal crystal as much as possible, thereby heightening the elongation surely to obtain excellent deformability.

At this time, as shown in region X in FIG. 7, even in the region wherein the alloy composition of the β phase causes the emergency of the brittle hexagonal crystal at the time of heating for annealing, if under the temperature not causing the emergency of the brittle hexagonal crystal the material is slowly cooled (for example, cooling in the furnace), the change in the microstructure of the titanium alloy changes along the β transus(Tβ) to suppress the emergency of the brittle hexagonal crystal. If its temperature range is avoided and usual cooling (for example, air cooling) is carried out, an annealed material having a high performance can be obtained.

Thus, the α+β type titanium alloy of the present invention obtained by avoiding the brittle range and being annealed as described above has a tensile strength of 900 MPa or more, and further has an elongation of 4% or more, and exhibits an anisotropy, that is, (longitudinal elongation)/(transverse elongation) of about 0.4–1.0 by great recovery of the transverse elongation. This makes it possible to obtain an annealed material having excellent deformability in the longitudinal and transverse directions.

Incidentally, FIG. 7 shows the relationship between annealing temperature and elongation at the time of annealing a cold-rolled strip comprising, for example, an α+β type titanium alloy of Ti—4.5%Al—2%Mo—1.6%V—0.5% Fe. As shown in FIG. 7, brittle hexagonal crystal makes its appearance at about 850° C. Therefore, when the cold coil-rolled titanium alloy having this composition is annealed, it is necessary that the annealing temperature is controlled out of the temperature which causes the brittle hexagonal crystal, preferably within the temperature range of 760–825° C. or 875—Tβ° C.

Even in the same α+β type titanium alloys of the present invention, their brittle hexagonal crystal production temperature range varies in accordance with their compositions. At the time of carrying out the present invention, it is preferred to make sure of this temperature range beforehand in accordance with the composition of the used titanium alloy and then control annealing temperature to be out of this temperature range. In this way, an annealed material having a high strength and an improved transverse elongation can be surely obtained.

At this time, the annealing must be performed at the above-mentioned high rolling reduction for some kind of cold rolled product. In the case, however, softening annealing is performed one or plural times on the way of the rolling, Thus, while work-hardening is relieved, the titanium alloy is cold rolled into any thickness. In all case, the titanium alloy of the present invention has a higher elongation than conventional α+β titanium alloys, so that it can be coil-rolled without the above-mentioned pack-rolling. The alloy keeps a high strength and simultaneously exhibits an excellent deformability by subsequent annealing.

The thus obtained α+β titanium alloy of the present invention can be made into coils for its excellent cold workability, and further can easily be manufactured into any form such as a wire, a rod or a tube regardless of the cold workability. The present alloy has both excellent strength property and ductility, and further has good weldability as described above, and its HAZ after welding has a high level ductility. For this reason, the present alloy can widely be used as applications which are subjected to welding until they are worked into final products, for example, a plate for a heat-exchanger, Ti gold driver head materials, welding tubes, various wires, rods, very fine wires.

EXAMPLES

The following will specifically describe the structural features, and effects and advantages of the present invention.

However, the present invention is not limited by the following Examples, and can be modified within the scope consistent with the subject manner of the present invention described above and below. All of them are included in the technical scope of the present invention.

Example 1

Titanium alloy ingots (60×130×260 mm) having the compositions shown in Table 1 were produced by button melting. The ingots were then heated to the β templating range (about 1100° C.), and rolled to break down into sample plates of 40 mm thickness. Subsequently, the plates were kept in the β temperature range (about 1100° C.) for 30 minutes and then air-cooled. The plates were then heated in the α+β temperature range (900–920° C.) below the β transus and hot rolled to produce hot rolled plates of 4.5 mm thickness. Thereafter, the plates were again annealed in the α+β temperature range (about 760° C.) for 30 minutes, and then their 0.2% proof strength, tensile strength and elongation were measured. Their test pieces were obtained by machining the surface of the sample plates into pieces having a gage length of 50 mm and a parallel portion width of 12.5 mm.

Next, test pieces for cold-rolling were subjected to shot-blasting and picking to remove oxygen-rich layers on the surfaces. These were used as cold rolling materials to continues to be cold rolled by rolled reduction amount of about 0.2 mm per pass until cracks in the plate surface were introduced. Thus, their cold-reduction was measured. In order to measure their weldability, the respective sample plates were heated at 1000° C., which was not less than the 62 transus, for 5 minutes and then air-cooled, to examine tensile property in the state of acicular microstructure.

The results are collectively shown in Table 2.

TABLE 1

| Symbol | Alloy composition (the balance: Ti) | Mo equivalence | Fe equivalence |
|---|---|---|---|
| A | 3.5 Mo—0.8 Cr—4.5 Al—0.3 Si | 3.5 | 0.4 |
| B | 3.5 Mo—0.5 Fe—0.8 Cr—4.5 Al—0.3 Si | 3.5 | 0.9 |
| C | 2.5 Mo—1.6 V—0.6 Fe—4.5 Al—0.15 Si—0.04 C | 3.6 | 0.6 |
| D | 2.5 Mo—1.6 V—0.6 Fe—4.5 Al—0.45 Si—0.04 C | 3.6 | 0.6 |
| E | 2.5 Mo—1.6 V—0.6 Fe—4.5 Al—1.0 Si—0.04 C | 3.6 | 0.6 |
| F | 2.5 Mo—1.6 V—0.6 Fe—4.5 Al—0.3 Si—0.08 C | 3.6 | 0.6 |
| G | 4.5 Mo—0.8 Cr—4.5 Al—0.3 Si | 4.5 | 0.4 |
| H | 2.5 Mo—1.6 V—0.6 Fe—4.5 Al—0.3 Si—0.12 C | 3.6 | 0.6 |
| I | 2.5 Mo—1.6 V—0.6 Fe—4.0 Al—0.3 Si—0.04 C | 3.6 | 0.6 |
| J | 2.5 Mo—1.6 V—0.6 Fe—5.0 Al—0.3 Si—0.04 C | 3.6 | 0.6 |
| K | 3.5 Mo—0.5 Fe—0.8 Cr—4.5 Al—0.3 Si—0.05 C | 3.5 | 0.4 |
| L | 3.5 Mo—0.5 Fe—0.8 Cr—4.5 Al—0.3 Si—0.1 C | 3.5 | 0.4 |
| M | 2 Mo—1.6 V—0.5 Fe—4.5 Al—0.3 Si—0.03 C | 3.1 | 0.5 |
| N | 1 Mo—1.6 V—0.5 Fe—4.5 Al—0.3 Si—0.03 C | 2.1 | 0.5 |
| O | 3.5 Mo—0.8 Cr—4.5 Al | 3.5 | 0.4 |
| P | 3.5 Mo—0.5 Fe—0.8 Cr—4.5 Al | 3.5 | 0.5 |
| Q | 4.5 Mo—0.8 Cr—4.5 Al | 4.5 | 0.4 |
| R | 2.5 Mo—1.6 V—0.6 Fe—4.5 Al—0.04 C | 3.6 | 0.6 |
| S | 3.5 Mo—0.5 Fe—0.8 Cr—3.0 Al—0.3 Si | 3 | 0.9 |
| T | 2.5 Mo—0.5 Fe—0.8 Cr—3.0 Al—0.3 Si | 2.5 | 0.9 |
| U | 3.0 Mo—0.5 Fe—0.8 Cr—3.0 Al—0.3 Si—0.05 C | 3.9 | 0.9 |
| V | 2.5 Mo—1.6 V—0.6 Fe—4.5 Al—1.5 Si—0.04 C | 3.6 | 0.6 |
| W | 2.0 Mo—1.6 V—0.6 Fe—6.5 Al—1.5 Si—0.04 C | 3.1 | 0.6 |
| X | 0.8 Mo—1.6 V—0.5 Fe—4.5 Al—1.5 Si—0.03 C | 1.9 | 0.5 |
| Y | 3.5 Mo—1.6 V—0.5 Fe—4.5 Al—1.5 Si—0.03 C | 4.6 | 0.5 |
| Z | 2 Mo—1.6 V—2.5 Fe—4.5 Al—0.3 Si—0.03 C | 3.1 | 2.5 |

TABLE 2

| | Tensile properties after β annealing (Acicilar, corresponding to HAZ after welding) | | | | Tensile properties after α + β annealing | | | | |
|---|---|---|---|---|---|---|---|---|---|
| Symbol | 0.2% Proof strength MPa) | Tension strength (MPa) | Elongation (%) | 6.9 × (YS-835) + 245 × (El-8.2) | 0.2% Proof strength (MPa) | Tension strength (MPa) | Elongation (%) | Cold reduction Being made into a coil | Note |
| A | 835 | 1010 | 8.2 | 0 | 882 | 937 | 15.5 | ○(possible) | |
| B | 963 | 1112 | 7.7 | 763 | 875 | 941 | 15.7 | ○ | |
| C | 1069 | 1250 | 3.8 | 538 | 822 | 900 | 19.2 | ○ | |
| D | 1121 | 1342 | 4.3 | 1019 | 885 | 963 | 17.8 | ○ | |
| E | 1191 | 1356 | 1.2 | 739 | 933 | 1061 | 12.8 | ○ | |
| F | 1087 | 1298 | 4.5 | 831 | 893 | 959 | 20.7 | ○ | |
| G | 994 | 1156 | 5.8 | 507 | 891 | 946 | 15.0 | ○ | |
| H | 992 | 1221 | 3.8 | 4 | 925 | 984 | 16.9 | ○ | |
| I | 1032 | 1223 | 6.2 | 869 | 815 | 912 | 17.9 | ○ | |
| J | 1164 | 1365 | 2.9 | 973 | 932 | 999 | 19.4 | ○ | |
| K | 1044 | 1215 | 3.6 | 313 | 940 | 992 | 19.0 | ○ | |
| L | 1080 | 1298 | 1.3 | 0 | 1085 | 1131 | 18.4 | ○ | |
| M | 827 | 907 | 8.5 | 19 | 857 | 916 | 19.2 | ○ | |
| N | 814 | 885 | 9.1 | 78 | 821 | 894 | 19.5 | ○ | |
| O | 775 | 974 | 10.1 | 53 | 785 | 861 | 22.6 | ○ | Insufficient strength |
| P | 880 | 1024 | 6.3 | −155 | 795 | 874 | 15.6 | ○ | Insufficient strength and bad weldability |

TABLE 2-continued

| Symbol | Tensile properties after β annealing (Acicilar, corresponding to HAZ after welding) 0.2% Proof strength MPa) | Tension strength (MPa) | Elongation (%) | 6.9 × (YS-835) + 245 × (EI-8.2) | Tensile properties after α + β annealing 0.2% Proof strength (MPa) | Tension strength (MPa) | Elongation (%) | Cold reduction Being made into a coil | Note |
|---|---|---|---|---|---|---|---|---|---|
| Q | 899 | 1039 | 4.9 | −369 | 767 | 835 | 21.2 | ○ | Insufficient strength and bad weldability |
| R | 1036 | 1249 | 1.3 | −305 | 810 | 889 | 17.7 | ○ | Insufficient strength and bad weldability |
| S | 751 | 920 | 11.5 | 227 | 652 | 781 | 16.5 | ○ | Insufficient strength |
| T | 734 | 899 | 13.2 | 528 | 703 | 810 | 16.7 | ○ | Insufficient strength |
| U | 1018 | 1238 | 3 | −10 | 767 | 856 | 16.3 | ○ | Insufficient strength and bad weldability |
| V | 1223 | 1373 | 0.5 | 791 | 983 | 1103 | 8.1 | X(impossible) | Bad cold-rollability |
| W | 1219 | 1429 | 0.3 | 715 | 975 | 1115 | 9.2 | X | Bad cold-rollability |
| X | 797 | 858 | 10.5 | 300 | 799 | 868 | 19.5 | ○ | Insufficient strength |
| Y | 1081 | 1229 | 0.5 | −190 | 1147 | 1179 | 18.9 | ○ | Bad weldability |
| Z | 1099 | 1278 | 0 | −190 | 1127 | 1229 | 17.4 | ○ | Bad weldability |

FIG. 1 shows, as a graph, the relationship between the 0.2% proof strength and the elongation after β annealing, which corresponds to the physical property in HAZ after welding, among the experimental data shown in Table 1.

In this graph solid line Y is a line connecting the relationship points between 0.2% proof strength and elongation of other than comparative samples wherein their cold reduction was represented by "x" (limit cold reduction: less than 40%). Broken line X represents a relationship formula represented by 6.9×(YS-835)+245×(EI-8.2).

As is evident from this graph, the solid line Y and the broken line X cross each other at a point of a 0.2% proof strength of 813 MPa. The inclination of the solid line Y (comparative samples) in the area having a higher proof strength than this proof strength is steeper than that of the broken line X. This graph proves that in the high proof strength area of the comparative samples, this elongation drops abruptly as the proof strength rises. On the other hand, in Examples of the present invention all of the relationship points between the proof strength and the elongation are positioned in the right and upper area relative to the broken line X. The drop in the elongation with the rise in the proof strength is relatively small. Thus, it can be ascertained that the samples of Examples had high strength and ductility.

Figure 8:
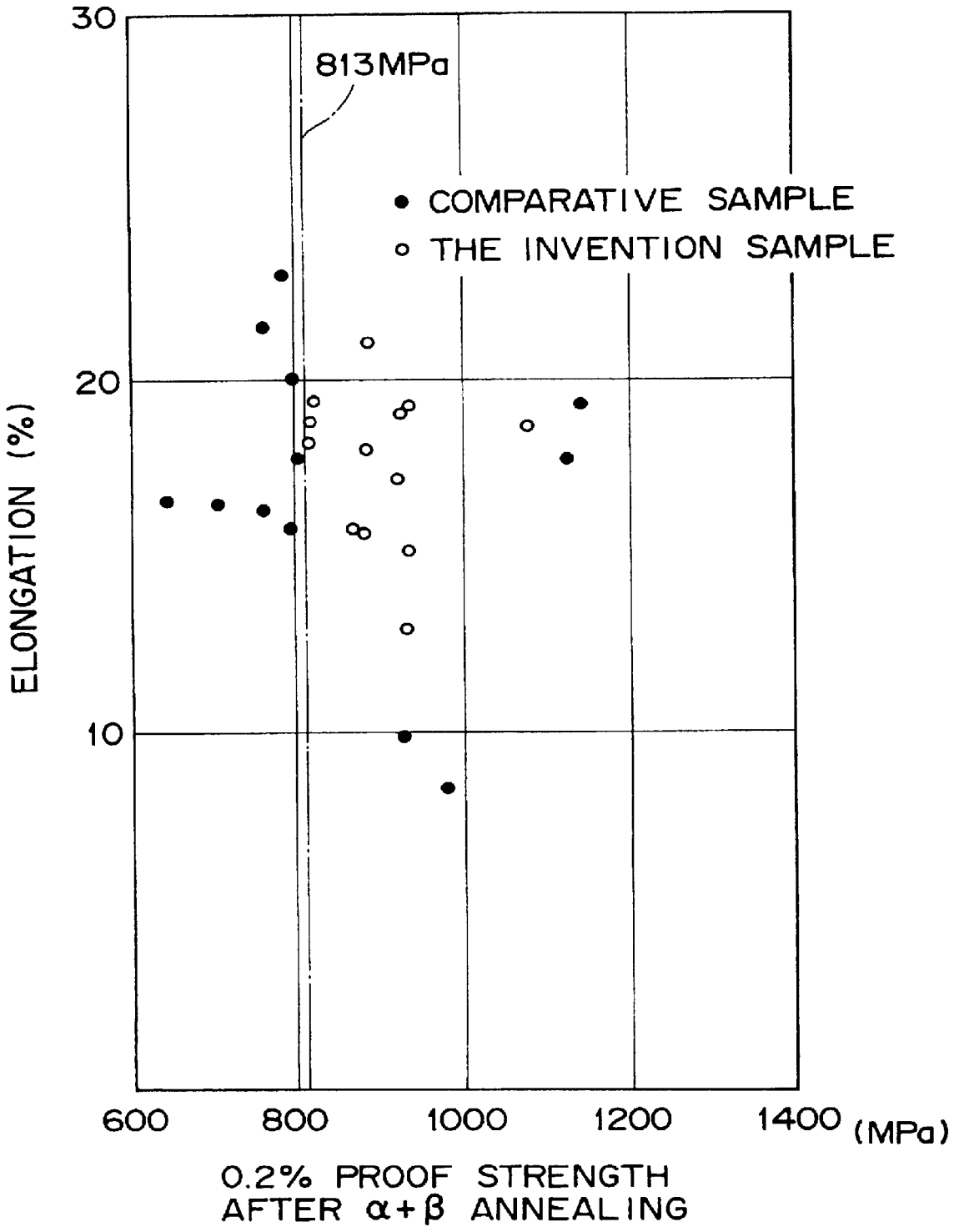
FIG. 8 is a graph showing the relationship between 0.2% proof strength and elongation after annealing in the α+β temperature range.

FIG. 8 is a graph showing an arranged relationship between the 0.2% proof strength and the elongation after α+β annealing. It can be understood from this graph that all of the comparative samples do not each a proof strength of 813 MPa but all of the samples of Examples exhibit a proof strength more than this value, and the material of the present invention has a high strength and an excellent ductility.

Example 2

Titanium alloys having the compositions shown in Table 3 were produced in a melting state by vacuum are melting and made into ingots (their diameter: 100 mm). The ingots were then heated to the β temperature range (about 1000–1050° C.), and rolled to break down into sample plates of 15 mm thickness. Subsequently, the plates were kept in the β temperature range (about 1000–1050° C.) for 30 minutes and then air-cooled. The plates were then heated in the α+β temperature range (850° C.), which was not more than the β transus, and hot rolled to produce hot rolled plates of 5.7 mm thickness. Thereafter, the plates were again annealed in the α+β temperature range (630–890° C.) for 5 minutes. Next, they were subjected to shot-blasting and pickling to remove oxygen-rich layers on the surfaces. These were used as cold rolling materials. In the cold coil-rolling, the rolling reduction amount was 0.2 mm per pass. In the rolling, tension was applied along the rolling direction to roll the plates up to a predetermined rolling reduction. After the rolling, the depth of edge cracks in the plates was measured. Thereafter, the plates were annealed in the α+β temperature range and then were subjected to optical microstructure observation of their cross section.

The results are shown in Table 4.

The difference in sectional microstructures was observed between the plates which were rolled one time up to a predetermined thickness and then annealed, and the plates which were rolled three times up to a predetermined thickness in a manner that annealing intervened therebetween on the way of the rolling process and then annealed. The results are shown in Table 5.

TABLE 3

| Al | Mo | V | Fe | Si | O | Ti | β transus |
|---|---|---|---|---|---|---|---|
| 4.5 | 2.0 | 1.5 | 0.5 | 0.3 (mass %) | 0.16 | balance | 963° C. |

TABLE 4

| Experiment No. | Rolling conditions: Rolling tension (MPa) | Rolling conditions: Rolling reduction (%) | Rolling conditions: Annealing temperature before rolling | Results: Edge cracks ◎: less than 5 mm ○: 5 mm–10 mm X: 10 mm or more | Results: Structure after annealing | Total judgement ○: Suitable X: unsuitable |
|---|---|---|---|---|---|---|
| 1 | 147 | 50 | 760 | ◎ | Equiaxial | ○ |
| 2 | 294 | 50 | 760 | ◎ | Equiaxial | ○ |
| 3 | 98 | 50 | 760 | ◎ | Equiaxial | ○ |
| 4 | 343 | 50 | 760 | ◎ | Equiaxial | ○ |
| 5 | 294 | 30 | 760 | ◎ | Equiaxial | ○ |
| 6 | 294 | 70 | 760 | ◎ | Equiaxial | ○ |
| 7 | 294 | 50 | 820 | ◎ | Equiaxial | ○ |
| 8 | 294 | 50 | 700 | ◎ | Equiaxial | ○ |
| 9 | 294 | 40* | 630 | X | Equiaxial | X |
| 10 | 294 | 30* | 890 | X | Equiaxial | X |
| 11 | 441 | 50 | 760 | X | Equiaxial | X |
| 12 | 294 | 10 | 760 | ◎ | Non-equiaxial | ○ |
| 13 | 294 | 85 | 760 | X | Equiaxial | X |

*Rolling load exceeded for a 50% rolling reduction of a target. Thus, the rolling was stopped on the way.

TABLE 5

| Experiment No. | Steps: Cold rolling 1 | Steps: α + β annealing | Steps: Cold rolling 2 | Steps: α + β annealing | Steps: Cold rolling 3 | Steps: α + β annealing | Total rolling ratio | Structure after the final annealing |
|---|---|---|---|---|---|---|---|---|
| 14 | 40% | Performed | 40% | Performed | 40% | Performed | 78.5% | Fine equiaxial microstructure |
| 15 | 80% | Performed | — | — | — | — | 80% | Partial equiaxial microstructure |

The following can be understood from Tables 3–5.

Experiments Nos. 1–8: Examples satisfying all of the requirements defined in the present invention. The microstructure of the annealing was uniformly equiaxial and had a few edge cracks, so as to be sufficiently suitable for practical use of coil-rolling.

Experiments Nos. 9 and 10: Comparative Examples wherein the temperature of the annealing before the rolling was out of the defined range. Edge cracks were generated before the arrival to a 50% rolling reduction which was a rolling target. Thus, the rolling was stopped when the rolling reduction was 40% to 30%. However, considerably large edge cracks were observed. It is difficult that the Comparative Examples were made practicable.

Experimental No. 11: Reference Example wherein a tension at the time of the rolling was raised up to 45%. The tension was too high, so that edge cracks were liable to be generated.

Experiment No. 12: Reference Example wherein the rolling ratio at the time of the rolling was set to a low value. The coil-rolling was able to be performed without any generation of large edge cracks. However, a part of the microstructure after the annealing became non-equiaxial. The strength-elongation balance was bad.

Experiment No. 13: Reference Example wherein the rolling reduction at the time of the rolling was raised up to 85%. Because the rolling reduction was excessively high, large edge cracks were observed.

Experiment No. 14: Example which was coil-rolled 3 times, the rolling reduction per rolling being 40%, in a manner that annealing intervened therebetween 2 times on the way. The microstructure after the final annealing was fine equiaxial, and a good coil which had no edge cracks and a good strength-elongation balance was obtained.

Experiment No.15: Example in which substantially the same rolling as in Experiment No. 14 was performed by a single rolling step without any annealing on the way. A part of the microstructure after the annealing became non-equiaxial. The strength-elongation balance was slightly bad.

Experiment 3-1

A Ti alloy ingot (80 $mm^T$×200 $mm^w$×300 $mm^L$) of Ti—2%Mo—1.6%V—0.5%Fe—4.5%Al—0.3%Si—%0.03% C was produced by induction-skull melting, heated in the β temperature range (about 1100° C.) and then rolled to break down into sample plates of 40 mm thickness. Subsequently, the plates were kept in the β temperature range (about 1100° C.) for 30 minutes and then air-cooled. The plates were then hot rolled in the α+β temperature range (900–920° C.), which was lower than the β transus to produce hot rolled plates of 4.5 mm thickness.

Next, the plates were annealed at 760° C. for 30 minutes, and then they were subjected to shot-blasting and pickling to prepare cold rolling materials. These were subjected to the treatment of [40% cold rolling+annealing at 760° C. for 5 minutes] two times to perform cold rolling up to a rolling reduction of 40%. Thereafter, annealing was performed under conditions shown in Table 6. The respective annealed products were pickled to remove oxygen rich layers on their surfaces. Their transverse and longitudinal 0.2% proof strength, tensile strength, and elongations were measured. The result are shown in Table 6 and FIG. 4.

TABLE 6

| Ti—3.5 Mo—0.5 Fe—4.5 Al—0.3 Si | | | | | |
|---|---|---|---|---|---|
| | Annealing temperature (° C.) | Measured direction | 0.2% Proof strength (MPa) | Tensile strength (MPa) | Elongation (%) |
| Example | 760 | L | 982 | 1096 | 10.4 |
| Comparative Example | 850 | L | 991 | 1202 | 7.8 |
| Example | 900 | L | 1028 | 1239 | 7.2 |
| Example | 760 | T | 1073 | 1144 | 4.6 |
| Example | 800 | T | 1082 | 1128 | 4.6 |
| Example | 825 | T | 1014 | 1087 | 5.6 |
| Comparative Example | 850 | T | 1082 | 1198 | 2 |
| Example | 900 | T | 1085 | 1164 | 5.8 |
| Example | 925 | T | 1095 | 1182 | 7.8 |
| Example | 950 | T | 1027 | 1143 | 10.6 |

As is clear from Table 6 and FIG. 4, it was ascertained that in the α+β type titanium alloy of the component systems used in the present invention the transverse elongation (the elongation in the direction perpendicular to the rolling direction) decreased remarkably by the production of brittle hexagonal crystal in the annealing temperature range of about 850° C. Thus, it can be understood that if the alloy was annealed in the temperature range of 750–830° C. or 900–950° C., out of the above-mentioned annealing temperature range, an annealed product was obtained which kept high tensile strength and 0.2% proof strength, and had an excellent elongation.

Experiment 3-2

A Ti alloy ingot (80 $mm^T$×200 $mm^w$×300 $mm^L$) of Ti—3.5%Mo—0.5%Fe—4.5%Al—0.3%Si was produced by induction-skull melting, and was heated in the β temperature range (about 1100° C.) for 30 minutes and then rolled to break down into sample plates of 40 mm thickness. Subsequently, the plates were kept in the β temperature range (about 1100° C.) and then air-cooled. The plates were then hot rolled in the α+β temperature range (900–920° C.), which was lower than the β transus to produce hot rolled plates of 4.5 mm thickness.

Next, the plates were annealed at 760° C. for 30 minutes and then they were subjected to shot-blasting and pickling to prepare cold rolling materials. These were subjected to the treatment of [40% cold rolling+annealing at 760° C. for 5 minutes] two times to perform cold rolling up to a rolling reduction of 40%. Thereafter, annealing was performed under conditions shown in Table 1. The respective annealed products were pickled to remove oxygen rich layers on their surfaces. Their transverse and longitudinal 0.2% proof strength, tensile strength, and elongations were measured. The result are shown in Table 7 and FIG. 5.

TABLE 7

| Ti—2 Mo—1.6 V—0.5 Fe—4.5 Al—0.3 Si—0.03 C | | | | | |
|---|---|---|---|---|---|
| | Annealing temperature (° C.) | Measured direction | 0.2% Proof strength (MPa) | Tensile strength (MPa) | Elongation (%) |
| Example | 760 | L | 982 | 1096 | 10.4 |
| Example | 850 | L | 906 | 1125 | 7.8 |
| Example | 900 | L | 1051 | 1244 | 7.2 |
| Example | 760 | T | 1092 | 1142 | 5.2 |

TABLE 7-continued

| Ti—2 Mo—1.6 V—0.5 Fe—4.5 Al—0.3 Si—0.03 C | | | | | |
|---|---|---|---|---|---|
| | Annealing temperature (° C.) | Measured direction | 0.2% Proof strength (MPa) | Tensile strength (MPa) | Elongation (%) |
| Comparative Example | 800 | T | 1007 | 1059 | 2.4 |
| Example | 825 | T | 986 | 1077 | 5.6 |
| Example | 850 | T | 985 | 1103 | 6.4 |
| Example | 900 | T | 1058 | 1249 | 6 |

As is clear from Table 7 and FIG. 5, it was ascertained that in the α+β type titanium alloy of the component systems used in the present invention the transverse elongation (the elongation in the direction perpendicular to the rolling direction) decreased remarkably by the production of brittle hexagonal crystal in the annealing temperature range of about 800° C. Thus, it can be understood that if the alloy was annealed in the temperature range of 760° C. or lower, or 820–950° C., out of the above-mentioned annealing temperature range, an annealed product was obtained which kept high tensile strength and 0.2% proof strength, and had an excellent elongation.

As described above, the present invention has a basic composition wherein the contained percentages of the isomorphous β stabilizing element and the eutectic β stabilizing element are defined, and a specified amount of Si, or additionally a small amount of C or O is incorporated into the basic composition. Thus, the present invention has a strength property which is not inferior to Ti—6Al—4V alloys which have been most widely used, and has remarkably raised cold workability, which is insufficient in the conventional alloys, to make coil-rolling possible. Moreover, the present invention can provide an titanium alloy having all of remarkably improved strength and ductility in HAZ after welding, and high workability, strength and weldability.

Therefore, the titanium alloy of the present invention can be used in various applications for its characteristics. The present invention can be very useful as, for example plates for heat-exchangers by using, in particular, excellent corrosion-resistance, lightness, heat conductivity and cold-formability.

What is claimed:

1. An α+β titanium alloy comprising:

at least one isomorphous β stabilizing element in a Mo equivalence of 2.0–4.5 mass %, at least one eutectic β stabilizing element in an Fe equivalence of 0.3–2.0 mass %, Si in an amount of 0.1–1.5 mass %, [and]

C in an amount of 0.01–0.15 mass %, *and*

*an Al equivalence of more than 3 mass* and not more than 5.5 mass

.

[2. The α+β titanium alloy according to claim 1, wherein the alloy further comprises an Al equivalence of more than 3 mass % and less than 6.5 mass %.]

3. A titanium alloy strip comprising the titanium alloy of claim 1, wherein the strip has a tensile strength of 900 MPa or more, an elongation of 4% or more, and a ratio of a longitudinal elongation in a coil-rolling direction to a transverse elongation in a direction perpendicular to the coil-rolling direction of form 0.4 to 1.0.

4. A process for using a titanium alloy, the process comprising forming a titanium alloy strip from the titanium alloy of claim 1, annealing the titanium alloy strip at a temperature T satisfying the following inequality: (β transus−270° C.)≦T≦(βtransus−50° C.), and then coil-rolling the annealed strip.

5. The process according to claim 4, wherein the titanium alloy strip is coil-rolled at a rolling reduction of 20% or more while a tension-roll of 49–392 MPa is applied to the strip.

6. The process according to claim 4, wherein the coil-rolling is performed plural times in a manner that an annealing step in an α+β temperature range intervenes therebetween.

7. A process for using a titanium alloy, the process comprising annealing the titanium alloy of claim 1 at a temperature not less than a temperature for relieving work-hardening during coil-rolling and not more than the β transus.

[8. A titanium alloy strip comprising the titanium alloy of claim 2, wherein the strip has a tensile strength of 900 MPa or more, an elongation of 4% or more, and a ratio of a longitudinal elongation in a coil-rolling direction to a transverse elongation in a direction perpendicular to the coil-rolling direction of from 0.4 to 1.0.]

* * * * *